July 19, 1955 F. J. BROWN 2,713,334
SELF ADJUSTING VALVE
Filed June 25, 1954

INVENTOR
*Frank J. Brown.*
BY *Learman & Learman*
ATTORNEYS

United States Patent Office 2,713,334
Patented July 19, 1955

2,713,334

SELF-ADJUSTING VALVE

Frank J. Brown, Saginaw, Mich.

Application June 25, 1954, Serial No. 439,436

8 Claims. (Cl. 123—90)

This invention relates to poppet type valves for internal combustion engines and more particularly to a self-adjusting valve of this nature.

As is well known in the art, because of the likelihood of unequal thermal expansion of the valve gear and the cylinder barrel in internal combustion engines after the engine has warmed, it is conventional practice to provide a slight clearance between the tappet and valve stem to prevent the valve from continuously riding open when hot. To prevent valve gear noise and wear arising from the cyclical closure of this clearance when the engine is first started and until it warms up, hydraulic tappets have been introduced and employed; however, tappets of this nature have been generally expensive to manufacture and have been used primarily in automobiles in the medium and upper price brackets. In order to hold fluid leak to a minimum, the component parts of hydraulic tappets have had to be manufactured with extremely close tolerance requirements. Further, the engine oil commonly used in the tappets tends to become gummy if not changed at frequent intervals and will in time clog the operation of the parts. Accordingly, experimenters have for a long time sought a simple and economical, self-adjusting valve which would compensate for expansions and obviate the employment of adjustable tappets.

One of the prime objects of the instant invention is to provide a self-adjusting valve which can be adjusted by the normal expansion in the cylinder to compensate for the thermal elongation of the parts, and thus eliminates the need for employing mechanically adjustable or hydraulic type tappets.

Another object of the invention is to design a valve of this type which is highly reliable and efficient in operation and will not stick or clog.

A further object of the invention is to provide a valve whose component parts are of strong and durable construction and will have a long and useful service life.

Another object of the invention is to design a valve which is smooth in operation and avoids noise, wear, and impact fatigue.

A further object of the invention is to design a valve which can be very readily disassembled for replacement of parts when necessary.

A still further object of the invention is to design a valve of the type described which can be very economically manufactured and assembled.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

Figure 1:
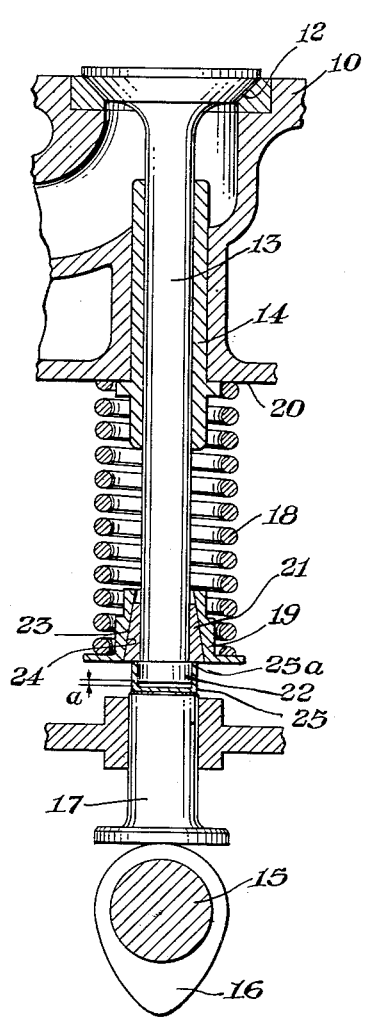
Fig. 1 is a sectional elevational view showing the valve in closed position when the engine has been initially started and is relatively cold.

Referring now more particularly to the accompanying drawings wherein I have shown a preferred embodiment of my invention, a numeral 10 generally indicates a portion of the engine casing or block of an internal combustion engine such as employed in automotive vehicles or the like, which is provided with passages 11 communicating with the head of the cylinder as usual. The passage 11 shown may be for the purpose of admitting fuel vapor to the cylinder or of exhausting the products of combustion, and it is to be understood that the valve which I will describe and claim may be employed as either an intake or exhaust valve.

The marginal wall of the opening 11 is shaped to define a valve seat 12 and a poppet type valve 13, reciprocable in a guide 14 in the block 10, is, of course, adapted to open and close the passage 11 in timed relation with the stroke of the piston in the cylinder. To raise the valve shown from its seat 12, the camshaft 15 is provided with a cam 16 which actuates the tappet 17. A valve spring 18 mounted on a spring washer 19 and bearing against the surface 20 of the block, returns the valve to closed position. In conventional constructions, the washer 19 and a tapered sleeve 21 are fixed to the end of the valve stem and an adjusting nut is provided on the tappet 17, the nut being set to maintain a clearance or lash between the tappet and valve stem when the engine is cold to permit expansion of the parts when the engine becomes hot. This clearance must be somewhat greater than the expected normal thermal elongation of the parts to provide for unusual conditions. While the provision of this lash or clearance has permitted the valve to seat when the engine has warmed, the cyclical closure of this clearance, until the expansion occurs, has been noisy and has caused excessive impact forces to be applied to the parts. To obviate the many disadvantages of prior constructions, I have perfected a valve which is self-adjusting in that its effective length will vary with the expansion and contraction of the parts.

A split sleeve 21 is mounted on the valve adjacent the enlarged end 22 of the valve stem. The outer surface of the sleeve 21 is tapered as at 23 to conform to the tapered bore 24 of the spring washer 19, and mounted on the extreme end of the valve stem is a cap 25 with a radial wall 25a adapted to bear against the end of the sleeve 21. The angle of taper of the sleeve 21 is critical, as will later become apparent, and I have found that a taper in the range of 20° to 30° relative to the axis of the valve when the spring 18 is of proper design to exert a compressive force of 200 pounds prior to opening of the valve, will operate satisfactorily to lock the sleeve and washer in position when the parts are relatively cold and to release the valve stem sufficiently to permit adjustment of the stem relative thereto to compensate for the thermal expansion of the parts. Specifically good results are obtained when the angle of taper is about 22° with a spring of the design indicated. Normally, when the engine is cold, a clearance "a" is provided between the end 22 of the valve stem and the end wall of the cap, and this lash or clearance "a" is greater than the length added to the system upon thermal expansion of the parts.

Figure 2:
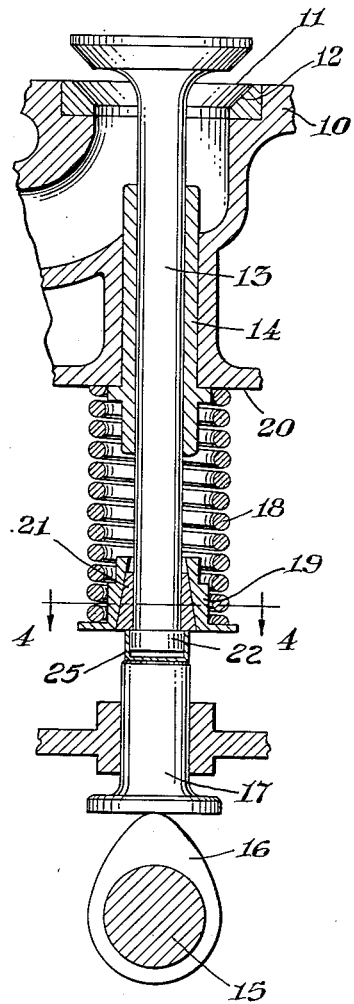
Fig. 2 is a similar view showing the valve in open position.
Figure 3:
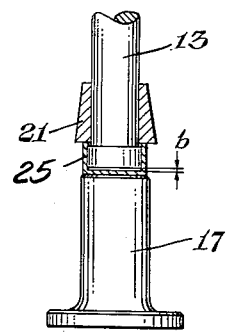
Fig. 3 is a similar view showing the valve after the engine has become warm and there has been thermal expansions of the valve and valve gear.
Figure 4:
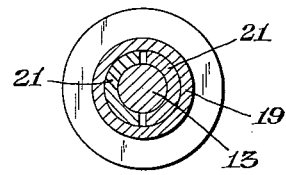
Fig. 4 is a sectional plan view taken on the line 4—4 of Fig. 3.

In operation, when the engine is cold (see Figs. 1 and 2), the sleeve 21 will clamp the stem of the valve with sufficient force to maintain the clearance "a" since the cap 25 will be in engagement with the tappet 17 and the valve will seat positively. Thus, there can be no slapping of the valve against its seat since the valve gear and valve form a continuous member and there is no clearance between the tappet and valve as with conventional tappet and valve assemblies. When the engine warms, there will be a thermal elongation of the parts; however, obviously, the greatest elongation will be in the valve stem adjacent the cylinder. The force of the explosion in the cylinder will then overcome the clamping force of the sleeve 21 and drive the valve relative to the sleeve which, of course, is immobile, toward the tappet sufficiently to compensate for the expansion and provide a positive seating of the valve. Thus, the lash or clearance will be reduced and when the engine is hot, will be of the magnitude "b" (see Fig. 3). If the engine then is shut off and cools, the clearance will be adjusted to the magnitude "a" again by the spring 18. Even if the spring loses considerable of its force without the knowledge of the driver through long service and is insufficient to overcome the force of the sleeve and return the valve, the lash will be equal only to the exact thermal elongation until the spring is replaced, thus reducing the noise and wear as compared with conventional valve and tappet assemblies.

The angle of taper must, of course, be sufficient to prevent the valve from slipping in the sleeve 21 when the engine is cold, but must permit the valve spring 18 to return the sleeve 21 to original position when the engine again cools after the engine has warmed and the explosion of the motor has adjusted the valve to the thermal elongation.

It is to be understood that various changes may be made in the various elements which comprise the invention or equivalent elements substituted for the elements defined, without departing from the spirit of the invention or the scope of the appended claims. The term telescoping as here used may be taken to mean any sliding or passing of associated elements or portions thereof to achieve a reduction or increase in length.

What I claim is:

1. In combination in an internal combustion engine including a cylinder and a passage through the wall thereof, a generally poppet type valve in said passage for cyclicly opening and closing the same, valve gear in engagement with the stem of the valve when the engine is at substantially atmospheric temperature for reciprocation of the valve, and the valve having telescoping portions actuated by the force of the explosion in the cylinder to adjust the effective length of the valve when there is thermal elongation thereof.

2. In combination in an internal combustion engine including a cylinder with an opening through the wall thereof, a poppet type valve in said opening, valve gear means in substantially axial alignment therewith, a member on the stem of said valve set to extend an adjusted distance beyond the end of said valve into substantial engagement with the valve gear means when the engine is at substantially atmospheric temperature, and means on said valve stem maintaining said member in position until the valve thermally elongates during operation of the engine and the explosion in the cylinder releases said means to permit relative adjustment of said member and valve to compensate for the expansion.

3. In combination in an internal combustion engine including an engine block with a cylinder therein and a passage through the wall of the block to said cylinder, a generally poppet type valve in said passage for cyclicly opening and closing the same, valve gear means operable to move said valve axially and open the valve, a spring washer having a tapered bore mounted on the stem of the valve, a spring under compression mounted on said stem between said spring washer and a portion of the engine block for closing the valve, a tapered gripper member on said stem accommodated in said bore and forced thereby to grip said stem, and a member on the end of said stem in engagement with said gripper member and with said valve gear means when the engine is at substantially atmospheric temperature, said member having relative adjustment with said valve stem to decrease the effective length of the valve when the engine warms and there is thermal elongation of the valve.

4. The combination defined in claim 3 in which said member on the end of the stem comprises a cap telescoped over the end thereof with a lash between the end of the valve stem and end wall of the cap.

5. The combination defined in claim 3 in which the angle of taper of the bore of the spring washer and the gripper member is within the range 20° to 30° relative to the axis of the stem when the spring is under substantially 200 pounds compression.

6. The combination defined in claim 3 in which the end of said valve stem is enlarged and the gripper member bears on the shoulder thus formed.

7. In combination in an internal combustion engine including an engine block with a cylinder therein and a passage leading through the wall of the block to said cylinder, said passage being formed with a valve seat at said cylinder, a poppet type valve in said passage with a head cyclicly opening and closing the same, said valve having a stem with an enlarged end, a tappet operable to move said valve axially to lift the head of the valve from the valve seat and open the passage, means actuating said tappet in timed relation, a cap telescoped over the end of said end of the stem with a clearance provided between the end of the stem and end of the cap, said cap being in engagement with the tappet, a split annular tapered gripper on said stem with the enlarged end thereof bearing on said cap and shoulder at the enlarged end of said stem, a spring washer with a tapered bore locking said gripper on the stem until there is thermal elongation of the valve and the force of the explosion in the cylinder drives the enlarged end of the stem further into said cap to decrease the effective length of the valve, and a spring under compression mounted between said washer and the engine block tending to retain the gripper in locked relation and returning said valve to original position when the engine cools.

8. In combination in an internal combustion engine including a cylinder and a passage through the wall thereof, a generally poppet type valve in said passage for cyclically opening and closing the passage, valve gear in engagement with the stem of the valve when the engine is at substantially atmospheric temperature for reciprocation of the valve, the valve having telescopable portions, and means maintaining said portions normally in relative position during operation of the valve until the valve thermally elongates during operation of the engine and the effective length of the valve is adjusted by the force of the explosion in the cylinder.

References Cited in the file of this patent

UNITED STATES PATENTS

| | | |
|---|---|---|
| 1,535,583 | Dobson | Apr. 28, 1925 |
| 1,857,005 | Schotthoefer | May 3, 1932 |
| 2,071,415 | Manning | Feb. 23, 1937 |
| 2,674,985 | Carlin | Apr. 13, 1954 |

FOREIGN PATENTS

| | | |
|---|---|---|
| 244,811 | Great Britain | Dec. 31, 1925 |

OTHER REFERENCES

S. A. E. Journal, August 1950, vol. 58, No. 8, p. 148.